United States Patent
Hiraoka et al.

(10) Patent No.: US 6,890,263 B2
(45) Date of Patent: May 10, 2005

(54) GAME MACHINE, AND IMAGE PROCESSING METHOD FOR USE WITH THE GAME MACHINE

(75) Inventors: Kazukuni Hiraoka, Suita (JP); Satoru Tashiro, Suita (JP)

(73) Assignee: SNK Playmore Corporation, Osaka (JP)

( * ) Notice: Subject to any disclaimer, the term of this patent is extended or adjusted under 35 U.S.C. 154(b) by 0 days.

(21) Appl. No.: 10/042,743

(22) Filed: Oct. 16, 2002

(65) Prior Publication Data

US 2003/0100365 A1 May 29, 2003

Related U.S. Application Data

(63) Continuation of application No. 09/238,967, filed on Jan. 27, 1999, now abandoned.

(30) Foreign Application Priority Data

Mar. 16, 1998 (JP) .............................................. 10-88177

(51) Int. Cl.$^7$ ................................................. A63F 9/24
(52) U.S. Cl. ........................................ 463/32; 345/418
(58) Field of Search ................................ 345/419, 422, 345/473; 463/31–33

(56) References Cited

U.S. PATENT DOCUMENTS

| | | | |
|---|---|---|---|
| 4,174,836 A | * | 11/1979 | Kearney ....................... 463/49 |
| 5,880,709 A | * | 3/1999 | Itai et al. .................... 345/629 |
| 5,995,111 A | * | 11/1999 | Morioka et al. ............. 345/592 |
| 6,034,690 A | | 3/2000 | Gallery et al. ............... 345/419 |
| 6,057,935 A | | 5/2000 | Freeman ....................... 358/1.9 |
| 6,126,545 A | * | 10/2000 | Takahashi et al. ............. 463/32 |
| 6,201,517 B1 | * | 3/2001 | Sato .............................. 345/7 |
| 6,409,598 B1 | * | 6/2002 | Takeuchi ...................... 463/31 |
| 6,443,842 B1 | * | 9/2002 | Totsuka ....................... 463/31 |
| 6,480,192 B1 | * | 11/2002 | Sakamoto et al. .......... 345/419 |
| 6,556,204 B1 | * | 4/2003 | Itai et al. ..................... 345/472 |
| 6,572,476 B2 | * | 6/2003 | Shoji et al. ................... 463/33 |
| 6,582,299 B1 | * | 6/2003 | Matsuyama et al. ........... 463/2 |

FOREIGN PATENT DOCUMENTS

| EP | 660266 A1 | * | 6/1995 | ............. G06T/1/20 |
|---|---|---|---|---|
| JP | 06301794 A | * | 10/1994 | ........... G06F/15/72 |
| JP | A-08-63614 | | 3/1996 | ........... G06T/15/00 |

* cited by examiner

Primary Examiner—Derris H. Banks
Assistant Examiner—Alex F. R. P. Rada, II

(57) ABSTRACT

A game machine capable of providing three-dimensional animated representations according to the progress of a game, considering focus. The game machine includes a memory device for storing three-dimensional data related to a plurality of objects and a game program; a player input section; a display section; and a computational processing device that perspectively converts the objects from a game program world coordinate system to a projection surface, and represents the perspectively-converted image data in an animated manner. The computational processing device performs settings such that a specific object or portion thereof is brought into focus, and the plurality of objects placed in the world space are blurred according to their depths relative to the specific object or portion thereof.

21 Claims, 4 Drawing Sheets

GAME MACHINE, AND IMAGE PROCESSING METHOD FOR USE WITH THE GAME MACHINE

This is a continuation of Application No. 09/238,967, filed Jan. 27, 1999, now abandoned.

BACKGROUND OF THE INVENTION

1. Field of the Invention

The present invention relates to a game machine in which a game proceeds according to a game program or according to operations of a player and, more particularly, to a game machine in which display means represents a three-dimensionally processed image.

2. Description of the Related Art

In recent years, the game industry has employed a method in which three-dimensional computer graphical images are positioned in the world coordinates and are then rendered on a projection screen as two-dimensional images.

The three-dimensional image is usually formed by a computer graphic designer through use of, for example, a plurality of polygons. A texture is pasted to the respective polygon, thereby representing a pattern or a color.

As mentioned above, in the state in which a plurality of three-dimensional images are positioned in the world coordinates and are rendered on a projection screen in consideration of information about the depth of each apex of the respective polygon, all the three-dimensional images are two-dimensionally rendered on the projection surface while in focus.

Incidentally, when capturing a scenic view, the human eye recognizes in-focus areas clearly but out-of-focus areas blurry. This applies to a photographic image; an in-focus area is clearly represented but an out-of-focus area appears blurry.

To the best of the knowledge of the present applicant, there exists no game machine which performs three-dimensional computational processing according to a game program and operations of the game player, as necessitated, and in which display means renders an image on a game screen in consideration of focus.

In other words, there are game machines which present a blurred image, such as that mentioned previously, on a demonstration screen other than a game screen—in which an image appears on display means—that is, a screen which demonstrates introduction of a game before starting of the game or a screen which does not involve player's commitment at all. However, there exists no game machine which considers the aforementioned blurring for unpredictable animated characters in accordance with the progress of the game.

A further explanation is now given of "focus." The general term "game" encompasses driving games, battle games, and shooting games. In the case of these games, the polygon that is positioned nearest to the player in the world space relative to the projection screen is not necessarily in focus. If the polygon positioned nearest to the player is in focus and rendered on the projection surface, and if the polygons positioned behind the nearest polygon are blurred in proportion to their respective depths, the player may have difficulty in playing the game.

For instance, in the foregoing shooting game, the player aims a gun at an image rendered on the projection surface, i.e., a target displayed on a CRT monitor of the game machine. At this time, the target is not necessarily positioned nearer to the player than is the projection surface. Objects such as drum cans which cannot be targets may be positioned in front of the target. Further, even when a plurality of targets are displayed on the monitor, the player does not necessarily aim at and shoot the target nearest to him.

Therefore, blurring of a target in proportion to its depth cannot be easily and simply applied to the field of game machines.

For reference, the technology of providing blurred representations employed in fields other than the game machine field will now be described.

For example, Japanese Patent Application Laid-open No. 8-63614 describes techniques for determination of a distance between an in-focus surface and a polygon, blurring of mapped data, and coordination of the mapped data. The term "coordination" is related to a texture mapping method and signifies pasting of a two-dimensional graphical pattern (i.e., mapped color data) to a three-dimensional image (i.e., an object), thereby representing the nature of the object. This definition is found on pg. 2, column 2, in lines 18 to 22 of Japanese Patent Application Laid-open No. 8-63614. However, the previously-described prior art (Japanese Patent Application Laid-open No. 8-63614) fails to describe a specific method of blurring objects in consideration of the distance between an in-focus surface and polygons serving as objects of display (i.e., objects).

In the field of computer graphics, a distributed ray-tracing method has already been known as a technique for providing blurred representations. This method involves calculating, through simulation, how objects located at positions other than an in-focus position are blurred by means of a lens effect, as required. Therefore, the method has a problem in that blurring of one screen display requires several tens of minutes. Therefore, the method can be applied only to a static image. However, in a field, such as the computer game field, that requires animating operations, there have already been established standards that define the time required for scanning one screen as 1/60 or 1/50 seconds. In view of processing speed, a CPU commonly used for a game is substantially unable to simultaneously satisfy the standards and to represent naturally-animated characters on the display means of the game machine, such as a monitor.

In the case of production of a three-dimensional animation through use of images blurred by the foregoing computer graphics technology, before broadcasting the animation a sufficient time is spent in preparing a great number of image data sets through perspective transformation, and animated character can be represented by interchanging of the image data sets. However, in the case of a game, images to be displayed cannot be determined univocally, and images change in accordance with various possibilities according to the progress of the game. Therefore, the images must be represented through computation processing, as required.

SUMMARY OF THE INVENTION

The present invention has been conceived to solve the foregoing problems, and the object of the present invention is to provide a game machine capable of providing three-dimensional animated characters in consideration of the player's focus according to the progress of a game.

According to one aspect of the present invention, there is provided a game machine that includes three-dimensional data related to a plurality of objects, a game program, and computational processing means which places the plurality of objects in a world coordinate system on the basis of the game program and the three-dimensional data, and which renders the plurality of objects located in the world coordinate system on a projection surface through perspective conversion, thereby representing the perspective-converted image data on display means in an animated manner, wherein the computational processing means performs settings in such a way that a specific object in the world coordinate system or a specific portion of the object is in focus, and blurs a plurality of objects located in the world space in accordance with the depth from the specific object or the specific portion of the object after the object or the specific portion has been set so as to be in focus.

Throughout the specification, the term "animated representation" signifies, e.g., representation of 50 to 60 frames per second on the display means. Displaying a plurality of frames in such a short period of time causes the player viewing the display means to perceive the objects appearing on the display means as being alive.

Throughout the specification, the expression "performing settings in such a way that a specific object or a specific portion of the object is in focus" signifies the processing of objects virtually located in the world coordinate system in such a way as to represent in-focus objects and out-of-focus objects on a per-object basis. If an object per se has a depth, settings are effected in such a way that a certain point, or a specific portion of the object nearest to the projection surface, is in-focus and the remaining points of the object are blurred in accordance with their depths. For example, if an object is a sphere, the points of the sphere itself are blurred according to their depths.

The technology described in Japanese Patent Application Laid-open Number 8-337439 (filed by the present inventor) and the technology known in the field of computer graphics such as a shading technique may apply to the blurring operations. However, since the blurring operations required at the time of animation are time-critical computational operations, they must be completed within a given period of time.

Preferably, the three-dimensional data must comprise at least a plurality of polygon-apex information representing objects, and color information corresponding to the individual polygons as determined by the polygon-apex information. When a plurality of objects located in the world coordinate system are rendered on the projection surface and the objects are processed at the time of texture mapping in which the color information is mapped on the polygons, the blurring operations are performed according to the depths of the objects.

In addition, the specific object or the specific portion of the object that is set so as to be in focus is changed in response to the operations of the player, as required.

The blurring operations constitute processing in which blurring is reflected on both the objects located nearer to the projection surface and the objects located deeper, relative to the specific object determined as being in focus or the specific portion of the object.

According to the present invention, a "specific object" or a "'specific portion' of the specific object" is in focus during a blurring operation. The object or its specific portion can be brought into focus by utilization of a line-of-sight sensor. More specifically, the line of sight of the player is tracked by means of the line-of-sight sensor. The "'specific portion' of the specific object" is determined relative to the position of the view point of the player on the monitor screen, which is evident from the result of detection made by the line-of-sight sensor. Alternatively, an object located at the point of view is taken as the "specific object" and is brought into focus. The object may be subjected to blurring operations such as those mentioned previously.

As mentioned above, the "specific portion" or "specific object" is determined "relative to" the position of the line of sight. As a matter of course, the position of view point of the player on the monitor screen that has been made evident from the result of the detection performed by the line-of-sight sensor may be taken as the "specific portion" or "specific object." In a predetermined case, the periphery of an object spaced a certain distance from the position of view point may be taken as the "specific portion" or "specific object."

According to another aspect of the present invention, there is provided a method comprising the steps of:

locating a plurality of objects in a world coordinate system in association with a game program;

determining, from the plurality of objects, a specific object or a specific portion thereof as being in focus according to operations performed by a player; and blurring other objects in such a way that the objects becomes more blurred with an increase in the depth thereof relative to the determined object or the specific portion of the determined object (or another object) as being in focus.

The specific object or the specific portion thereof determined as being in focus corresponds to a specific object or a specific portion of the specific object displayed at substantially the center of the display means. The specific object or the specific portion thereof that is displayed at substantially the center of the display means corresponds to a specific object or a specific portion thereof which appears on substantially the center of the projection surface through perspective conversion.

Throughout the specification, the term "depth" is a general concept which signifies not only the "distance in a moving-away direction" from the specific portion but also the "distance in an approaching direction" from the specific portion. In view of the three-dimensional image processing, the distance in a moving-away direction and the distance in an approaching direction are distinguished from each other by means of a positive or negative sign relative to the position of a specific portion of a specific object. Therefore, the depth does not affect the essence of an embodiment of the present invention regarding blurring operations and can be handled as a mere matter of a relative position with reference to a certain point.

Even under the method according to the present invention, a "specific object" or a "specific portion" may be set with reference to the position of view point of the player on the monitor screen as determined through use of a line-of-sight sensor, and other objects may be blurred relative to the thus-determined specific object or the specific portion.

BRIEF DESCRIPTION OF THE DRAWINGS

FIGS. 3(A) and 3(B) are illustrations showing blurred images and unblurred images, wherein FIG. 3(A) illustrates examples of unblurred images and FIG. 3(B) illustrates examples of blurred images.

DETAILED DESCRIPTION OF THE PREFERRED EMBODIMENT

One embodiment to which the present invention is applied will be described hereinbelow by reference to FIGS. 1 through 4.

Figure 1:
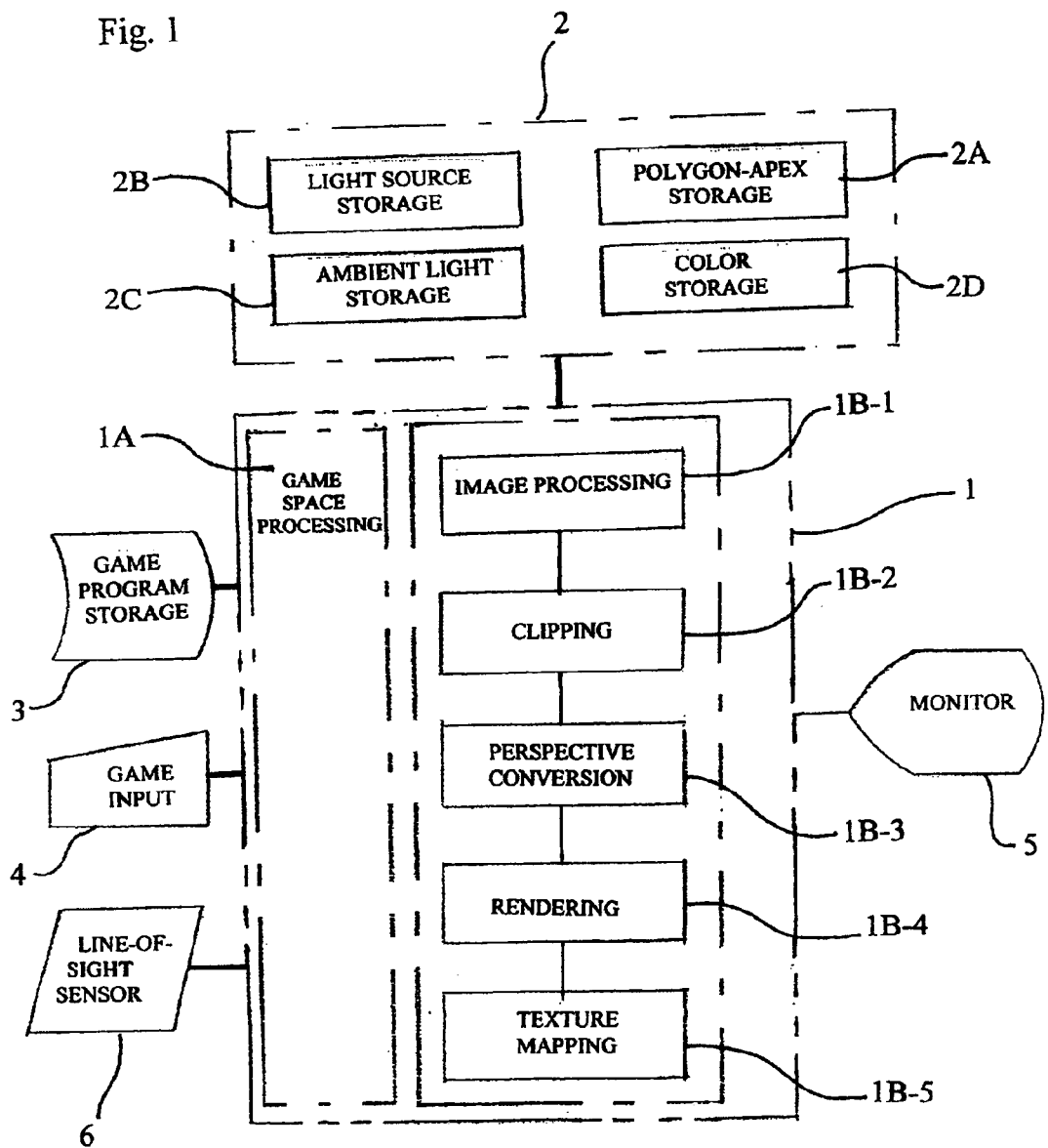
FIG. 1 is a block diagram of a game machine according to one embodiment of the present invention.

FIG. 1 is a block diagram of a game machine to which the present invention is applied. Reference numeral 1 designates computing means; 2 designates a three-dimensional data storage section for storing three-dimensional data; 3 designates a game program storage section for storing a game program; 4 designates a game input section by way of which a player actuates the game machine; 5 designates a monitor; and 6 designates a line-of-sight sensor.

The computing means 1 comprises game space processing means 1A for computing the layout of a plurality of objects in a world coordinate system of a virtual world space in accordance with the progress of the game as determined by the game program or in accordance with input operations performed by the player by way of the game input section 4; and image processing means 1B for modeling or coloring the plurality of objects in the world coordinate system on the basis of results of the processing performed by the game space processing means 1A.

Figure 2:
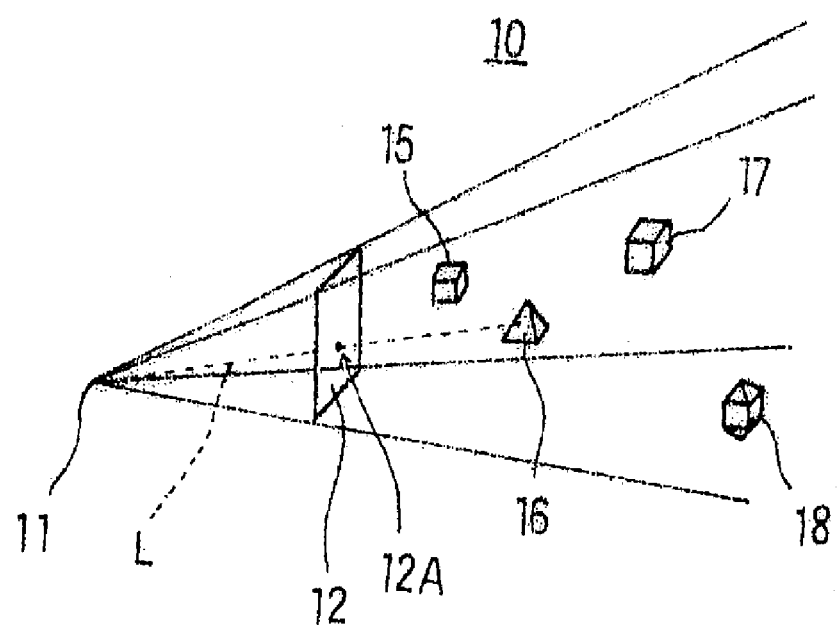
FIG. 2 is a schematic representation showing the layout of a plurality of objects in a world coordinate system.

The image processing means 1B subjects the plurality of objects modeled in the world coordinate system to computational processing such as shading or coloring operations. FIG. 2 virtually shows the plurality of objects that are modeled in the world coordinate system of the world space. In FIG. 2, reference numeral 10 designates a world space; 11 designates a point of view; 12 designates a projection surface; and 15, 16, 17, and 18 designate objects.

The role of the image processing means 1B will now be described in detail. On the basis of results of the processing performed by the game space processing means 1A, the plurality of objects are modeled with regard to a virtual world coordinate system by reference to polygon-apex information read from a polygon-apex information storage section 2A within the three-dimensional data storage section 2 (step 1).

Of the plurality of objects modeled with regard to the world coordinate system, only those objects that exist in the world coordinate space 10 rendered on the projection surface 12 when viewed from the point of view 11 are subjected to clipping 1B-2 (step 2). If all the objects located in the world coordinate system are subjected to computational processing such as shading or texture mapping, which will be described later, computational processing requires a large amount of time and would result in wasteful computation, because resultant information would not be required by the projection 12. For these reasons, clipping is performed beforehand for the purpose of eliminating information regarding objects other than the objects existing in the world space to be rendered on the projection surface 12.

After the clipping operation, the objects that have been clipped (e.g., objects 15 through 18 shown in FIG. 2) are subjected to perspective conversion 1B-3 (step 3) with respect to the projection surface 12, in decreasing order of distance therefrom.

The objects that have been perspectively converted with respect to the projection surface 12 are subjected to rendering 1B-4 (step 4). The thus-perspectively-converted objects are subjected to shading on the basis of light source information read from a light source information storage section 2B related to the three-dimensional data and ambient light information read from an ambient light information storage section 2C. Further, the objects are subjected to blurring operations on the basis of depth information (Z value) related to the polygon-apex information and color information read from a color information storage section 2D in which graphical pattern information regarding individual polygons are stored. Various techniques may apply to the blurring operations, and one example of the techniques will be described later.

On the basis of the information acquired through the rendering operation 1B-3 (step 3) and the information acquired through the perspective conversion 1B-4 (step 4), polygons which are the objects perspectively converted with respect to the projection surface 12 are subjected to coloring, that is, texture mapping 1B-5 (step 5).

As mentioned above, on the basis of the polygon-apex information, the objects are written over unillustrated VRAM which stores one frame to be displayed on display means or the monitor 5, in decreasing order of distance therefrom. The game machine according to the present embodiment comprises two pieces of VRAM, and writing of information corresponding to one frame takes $\frac{1}{60}$ seconds. One VRAM displays an image on the monitor 5 simultaneous with writing, on the remaining VRAM, of the data required for displaying the next image. As a result, 60 frames are displayed per second on the monitor 5, thereby effecting animated expressions.

While the view point of the player is tracked over the monitor 5 through use of the line-of-sight sensor 6, the point of view is brought into focus, and blurring operations, which will be described in detail later, are performed. As a result, more realistic images can be provided for the player, thereby enhancing the entertainment value of the game.

Figure 3A:
Figure 3B:
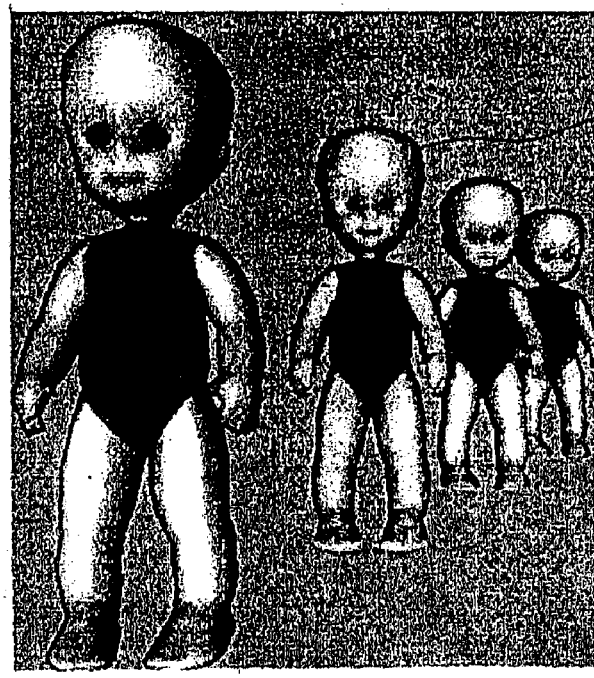
Figure 4:
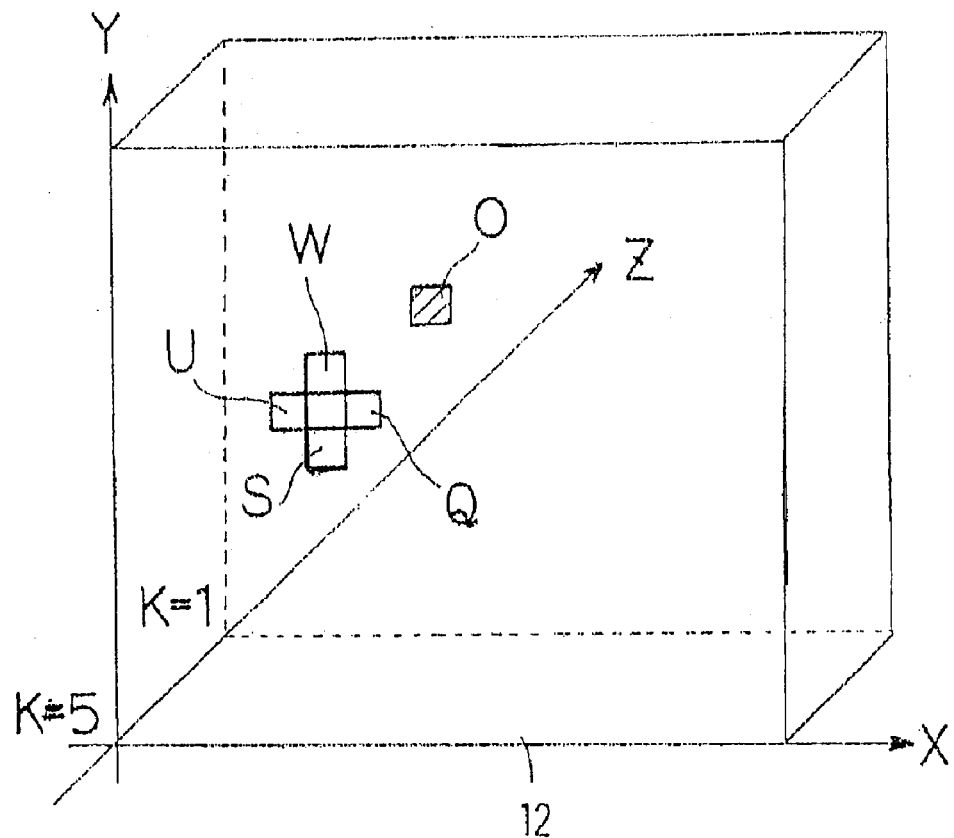
FIG. 4 is a schematic representation for describing the principle of one example of blurring operations.

The blurring operations will now be described. FIG. 3(A) illustrates unblurred images., and FIG. 3(B) illustrates blurred images. In the image shown in FIG. 3(B), the second baby in the row of babies is in focus. The remaining objects are blurred by changing the brightness of pixels representing the objects according to the depths of the individual objects. For example, assume that an arbitrary pixel O is placed in the world coordinate system, as shown in FIG. 4. If the pixel O is represented with respect to the projection surface 12, eight pixels are adjacent to the pixel O. Of the eight pixels, four pixels Q, S, U, and W which are adjacent to the pixel O in either the vertical or horizontal direction and are most vulnerable to being affected by the influence of brightness. These four pixels are taken into consideration.

On the basis of the brightness "a" of the pixel O as determined from the original data stored in the color information storage section 2D, the brightness "b" of the pixel Q, the brightness "c" of the pixel S, the brightness "d" of the pixel U, and the brightness "e" of the pixel W, the brightness "p" of the pixel O that has been blurred is computed by means of the image processing means 1B and through the rendering operation 1B-4.

More specifically, the in-focus pixel is compared with the remaining pixels, thereby obtaining information about depths of the individual pixels. According to the absolute values of difference in depth, the extent to which a pixel is affected by an adjacent pixel is classified into five stages. When k=1, an arbitrary pixel is most affected by the brightness of the adjacent pixels, and the brightness of the arbitrary pixel is set to a mean value of brightness of the remaining four pixels. Further, when k=5, the brightness of the arbitrary pixel based on its original data is directly reflected.

The foregoing relationship may be represented by $$p=(aK+bm+cm+dm+em)/5$$

where m=(5−k)/4.

In the foregoing blurring operation, the projection surface 12 assumes a depth value at which focus is attained, i.e., a value of null. More specifically, this case is based on the assumption that a specific portion of a specific object determined as being in focus matches the depth of the projection surface 12. As a matter of course, the present invention can be applied to a case where a specific portion of the specific object determined as being blurred does not match the projection surface 12. For example, as shown in FIG. 2, in a case where an object (e.g., the object 16 shown in FIG. 2) positioned in a line L passing through the center 12A of the projection surface 12 and the point of view 11 is in focus, the object 16 is not blurred at all. The point where the line L intersects the object 16 is taken as the reference point, and the remaining objects can be blurred more intensively with increasing the distance from the reference point. The image information rendered on the center 12A of the projection surface 12 is finally indicated substantially at the center of the monitor 5.

Every pixel may be blurred on the basis of the depth thereof from the reference point. Alternatively, each object maybe compared with a reference depth value (e.g., the position of barycenter of a three-dimensional object) and may be subjected to predetermined blurring operations.

The present invention is not limited to the blurring operation such as that mentioned above; other blurring methods may also be applied to the present invention. So long as a method under which a difference in distance among the objects with respect to the in-focus specific object or the specific portion of the object can be represented on the monitor 5, the method may employ a known dithering technique of increasing the intensity of shading with an increase in the value of depth.

The depth may be freely set as a matter of processing the distance of an object from the specific object or the specific portion of the specific object in a positive or negative direction.

The present invention comprising the structure and steps such as those mentioned above yields the following advantageous results.

The present invention is capable of providing more-realistic game images by representing perspectively-blurred images which have not been realized by existing game machines that represent animated characters.

The present invention enables blurring of polygons in a comparatively simple manner at the time of performing texture mapping in which graphical patterns are pasted onto predetermined polygons. For instance, polygons may be blurred by reducing the brightness of graphical patterns to be pasted onto the polygons to such an extent that the graphical patterns become darker than a portion or object determined as being in focus, in consideration of pre-stored color information.

According to the present invention, a specific object or a specific portion of the object that is determined as being in focus can be changed in response to operations performed by the player, as required. For instance, in the case of a shooting game, a targeted object may be represented as being in focus, and the remaining objects may be represented as being blurred. As a result, game images approximating real shooting situations can be represented by reducing interference with the playing of the game.

More specifically, if the player attempts to shoot an enemy character (i.e. an object) positioned deep in the display means, the player may encounter a problem unique to the game, such as a difficult in targeting the object that is represented as being blurred. Further, even in a real world, an object which attracts the attention of a person comes into focus. The present invention can realize representations approximating the real world.

In addition to yielding the foregoing advantageous results, the present invention may yield another advantage of providing representations in which even when, of a plurality of objects located in the world coordinate system, an object located in a deep position is brought into focus in response to the progress of the game or operations performed by the player, there may be provided an image analogous to that which would be acknowledged in reality. More specifically, when an object located at a position away from the person is brought into the person's focus, other objects located in front of the in-focus object are recognized as being blurred. The present invention can provide representations similar to such a representation.

Further, according to the present invention, while the point of view of the player is tracked over the monitor through use of the line-of-sight sensor, focus is attained on the basis of the point of view and the remaining objects are blurred. As a result, a more realistic image can be provided to individual players, thus enhancing the entertaining characteristics of the game.

The present invention can provide perspectively-blurred representations, which have never been realized by existing animation game machines, thus resulting in a more realistic game image.

In the real world, when the person attempts to see an object, he usually moves his eyes or neck in such a way that an object of focus comes to the center of his or her visual range. The present invention enables the display means to provide representations similar to such a realistic action.

What is claimed is:

1. A game machine comprising:
   (a) a memory device for storing three-dimensional data related to a plurality of objects and a game program;
   (b) an input section by way of which a player performs operations;
   (c) a display section for representing image data in an animated manner; and
   (d) a computational processing device which places the plurality of objects in a world coordinate system on the basis of the game program and the three-dimensional data read from the memory, perspectively converts the plurality of objects placed in the world coordinate system with respect to a projection surface, and represents on the display section the perspectively-converted image data in an animated manner;
   (e) wherein the computational processing device performs settings in such a way that a specific object or a specific portion thereof is brought into focus and the plurality of objects placed in the world space are blurred according to the depths thereof relative to the specific object determined as being in focus or the specific portion thereof determined as being in focus, wherein the specific object or the specific portion thereof is playable by game players.

2. The game machine as defined in claim 1, wherein the three-dimensional data must comprise at least a plurality of polygon-apex information representing objects, and color information corresponding to the individual polygons as determined by the polygon-apex information; and when a plurality of objects located in the world coordinate system are rendered on the projection surface and the objects are processed at the time of texture mapping in which the color information is mapped on the polygons, the blurring operations are performed according to the depths of the objects.

3. The game machine as defined in claim 2, wherein the blurring operations constitute processing in which blurring is reflected on both the objects located nearer to the projection surface and the objects located deeper, relative to the specific object determined as being in focus or the specific portion of the object.

4. The game machine as defined in claim 1, wherein the specific object or the specific portion of the object that is set so as to be in focus is changed in response to the operations of the player, as required.

5. The game machine as defined in claim 4, wherein the blurring operations constitute processing in which blurring is reflected on both the objects located nearer to the projection surface and the objects located deeper, relative to the specific object determined as being in focus or the specific portion of the object.

6. The game machine as defined in claim 1, wherein the specific object or the specific portion thereof determined as being in focus corresponds to a specific object or a specific portion of the specific object displayed at substantially the center of the display means.

7. The game machine as defined in claim 6, wherein the blurring operations constitute processing in which blurring is reflected on both the objects located nearer to the projection surface and the objects located deeper, relative to the specific object determined as being in focus or the specific portion of the object.

8. The game machine as defined in claim 1, wherein the specific object or the specific portion of the specific object determined as being in focus is set by tracing the line of sight of the player through use of a line-of-sight sensor and on the basis of the position of the point of view of the player on a monitor screen, which has been determined from the result of detection of the line-of-sight sensor.

9. The game machine as defined in claim 8, wherein the blurring operations constitute processing in which blurring is reflected on both the objects located nearer to the projection surface and the objects located deeper, relative to the specific object determined as being in focus or the specific portion of the object.

10. The game machine as defined in claim 1, wherein the specific object or the specific portion of the specific object determined as being in focus is set by tracing the line of sight of the player through use of a line-of-sight sensor and is identical to the position of the point of view of the player on a monitor screen, which has been determined from the result of detection of the line-of-sight sensor.

11. The game machine as defined in claim 10, wherein the blurring operations constitute processing in which blurring is reflected on both the objects located nearer to the projection surface and the objects located deeper, relative to the specific object determined as being in focus or the specific portion of the object.

12. The game machine as defined in claim 1, wherein the blurring operations constitute processing in which blurring is reflected on both the objects located nearer to the projection surface and the objects located deeper, relative to the specific object determined as being in focus or the specific portion of the object.

13. An image processing method for use with a game system comprising the steps of:

locating a plurality of objects in a world coordinate system in association with a electronic game program;

determining, from the plurality of objects, a specific object or a specific portion thereof as being in focus according to operations performed by a player; and blurring other objects in such a way that the objects becomes more blurred with an increase in the depth thereof relative to whichever object or portion thereof is determined.

14. The image processing method for use with a game system as defined in claim 13, wherein the specific object or the specific portion thereof that is displayed at substantially the center of the display means corresponds to a specific object or a specific portion thereof which appears on substantially the center of the projection surface through perspective conversion.

15. The image processing method for use with a game system as defined in claim 13, wherein the specific object or the specific portion of the specific object determined as being in focus is set by tracing the line of sight of the player through use of a line-of-sight sensor and on the basis of the position of the point of view of the player on a monitor screen, which has been determined from the result of detection of the line-of-sight sensor.

16. The image processing method for use with a game system as defined in claim 13, wherein the specific object or the specific portion of the specific object determined as being in focus is set by tracing the line of sight of the player through use of a line-of-sight sensor and is identical to the position of the point of view of the player on a monitor screen, which has been determined from the result of detection of the line-of-sight sensor.

17. The image processing method for use with a game system as defined in claim 13, wherein in the step of determining, the operations select the specific object or specific portion thereof from among the plurality of objects.

18. A game machine for use by a player, comprising:

a game program configured to manipulate data representing a plurality of objects in response to game operations input by the player;

a computational processing device configured to calculate positional data placing the plurality of objects in a three-dimensional world coordinate system on the basis of the game program and the data representing the plurality of objects, wherein the computational processing device is further configured to calculate image data representing a perspective view on a projection surface of an animated representation of the plurality of objects placed in the world coordinate system;

a display configured to display the image data in an animated manner; and an input device configured for the player to input the game operations into the game program;

wherein, in response to the game operations, the game program is configured to identify an object or object portion from among the plurality of objects; and wherein the computational processing device is configured to calculate image data such that whichever object or object portion is identified, that object or object portion is displayed in focus on the display, and other objects or object portions of the plurality of objects are blurred on the display according to their depths relative to the identified object or object portion.

19. The game machine as defined in claim 18, wherein the game program is configured such that the game operations of the player can change which object or object portion is identified by the player.

20. The game machine as defined in claim 18, wherein the input device includes a sensor configured to sense the view-point upon which the player's view is centered on the display, and wherein the identified object or object portion is determined from the location of the view-point.

21. The game machine as defined in claim 18, wherein the game operations select the object or object portion from among the plurality of objects.

* * * * *